United States Patent
Chen et al.

(10) Patent No.: US 7,726,850 B2
(45) Date of Patent: Jun. 1, 2010

(54) LIGHT-REFLECTING AND LIGHT-SHIELDING APPARATUS OF COMPUTER PANEL

(75) Inventors: Yun-Lung Chen, Taipei Hsien (TW); Qing-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 180 days.

(21) Appl. No.: 11/831,972

(22) Filed: Aug. 1, 2007

(65) Prior Publication Data

US 2009/0010002 A1    Jan. 8, 2009

(30) Foreign Application Priority Data

Jul. 4, 2007 (CN) .................. 2007 2 0200601 U

(51) Int. Cl.
*F21V 7/00* (2006.01)

(52) U.S. Cl. .................. 362/341; 362/384; 362/85; 362/89; 362/277; 362/282

(58) Field of Classification Search .................. 362/341, 362/384, 85, 89, 277, 282, 319, 322, 464
See application file for complete search history.

(56) References Cited

U.S. PATENT DOCUMENTS

| 4,019,044 | A | * | 4/1977 | Kelly et al. | .................. 362/307 |
| 4,412,276 | A | * | 10/1983 | Blinow | .................. 362/278 |
| 4,570,205 | A | * | 2/1986 | Shiojiri | .................. 362/18 |
| 4,760,499 | A | * | 7/1988 | Il | .................. 362/512 |
| 5,860,733 | A | * | 1/1999 | Stone et al. | .................. 362/294 |
| 7,140,747 | B2 | * | 11/2006 | Yang | .................. 362/202 |
| 2008/0030996 | A1 | * | 2/2008 | Chen | .................. 362/362 |

* cited by examiner

*Primary Examiner*—Sandra L O'Shea
*Assistant Examiner*—Evan Dzierzynski
(74) *Attorney, Agent, or Firm*—Frank R. Niranjan

(57) ABSTRACT

A panel assembly for reflecting and shielding rays of a light source (20), includes a panel (10) and a light-reflecting member (30) pivotably mounted to the panel. The panel includes a base (11) and a bent plate (13) perpendicular to the base. A light-pervious board (131) is disposed on the panel. The light-reflecting member defines an opening (32) facing the light pervious area, for reflecting light rays to be incident on the light-pervious area through the opening, wherein the light-reflecting member is rotatable to change position of the opening of the light-reflecting member relative to the light-pervious area, thereby adjusting the brightness of the light-previous area.

19 Claims, 8 Drawing Sheets

LIGHT-REFLECTING AND LIGHT-SHIELDING APPARATUS OF COMPUTER PANEL

BACKGROUND

1. Technical Field

The present invention relates to front panels of computer systems, and more particularly to a front panel of a computer system with a light-reflecting and light-shielding apparatus.

2. General Background

Usually, a light source, such as a light-emitting diode, is installed on a front panel of a computer system, in order to display the working state of the computer system. Generally, a light-pervious switch button is positioned on the front panel. When the switch button is pushed to press an electrical switch, the power supply switches on and the light source emits light, and the switch button is illuminated. However, in conventional computer systems, one light source corresponds to only one switch button. If another switch button or light-pervious member needs illumination, additional light-emitting diodes should be provided. In addition, the light-emitting diode as a spot light source, lights only a limited area.

Another conventional apparatus is provided for illuminating more light-pervious members and enlarging the lit area of the light source, which includes an arcuate flat light-reflecting member mounted on a computer panel. The light-reflecting member includes a light incident surface, a light-guiding portion, and a light-showing portion. A bracket is disposed above the light incident surface for receiving a light source. Rays emitted by the light source are reflected by the light-guiding portion, and illuminate a larger area of the computer panel via the light-showing portion. However, the light of the computer panel cannot be shielded when users don't want to see the light while the computer is running.

What is needed, therefore, is a front panel of a computer system with a light-reflecting and light-shielding apparatus allowing a larger area of the computer panel to be lit and also shield the light when so desired.

SUMMARY

A panel assembly comprises a panel comprising a base and a bent plate perpendicular to the base, a light-reflecting member pivotably mounted to the base of the panel. The bent plate has a light-pervious area. The light-reflecting member defines an opening opposite to the light-pervious area, for directing light rays to be incident on the light-pervious area through the opening thereof, wherein the light-reflecting member is rotatable to change position of the opening of the light-reflecting member relative to the light-pervious area, thereby adjusting the brightness of the light-previous area.

Other advantages and novel features will be drawn from the following detailed description of preferred embodiments with attached drawings, in which:

DETAILED DESCRIPTION OF PREFERRED EMBODIMENTS

Figure 1:
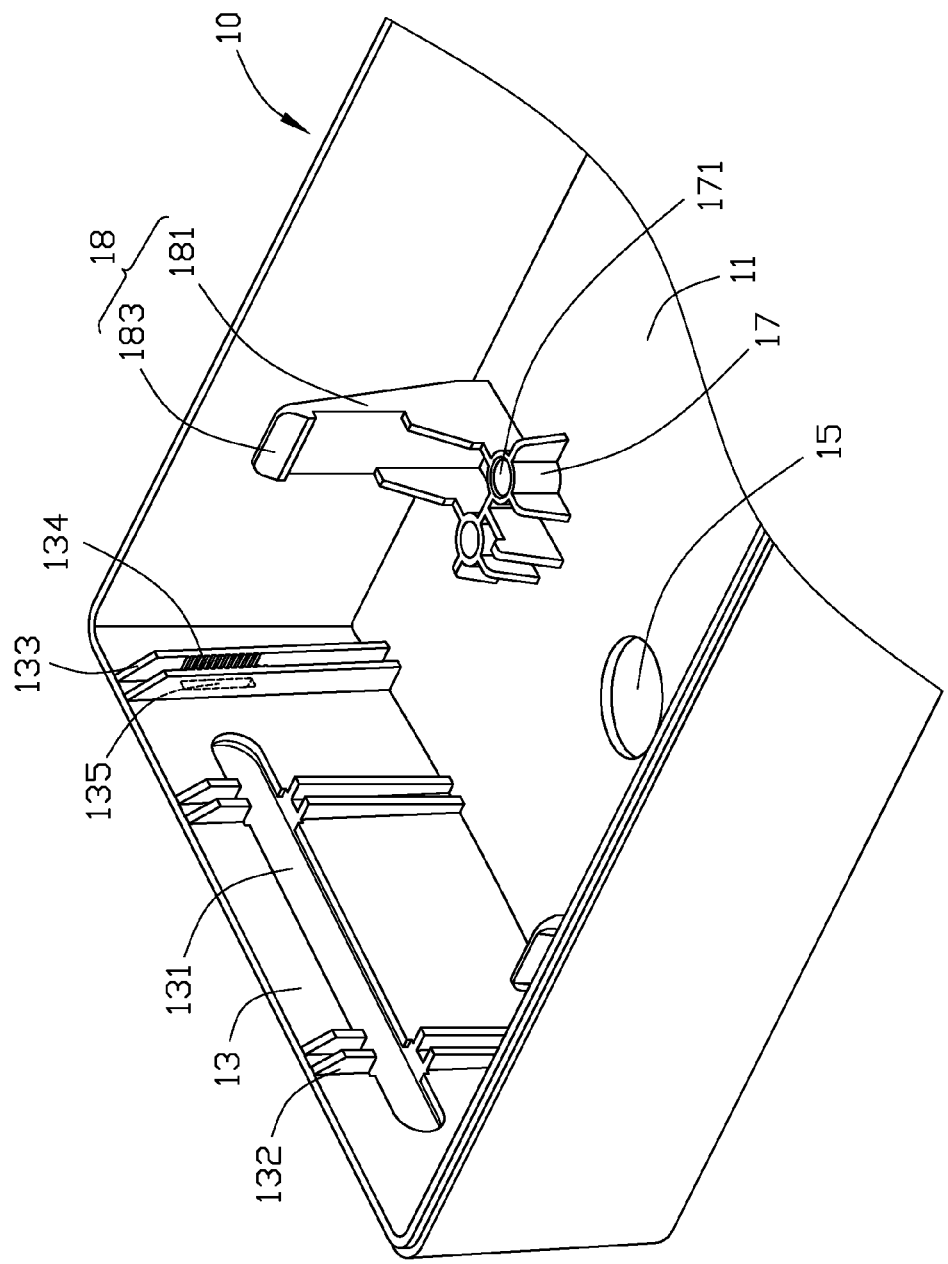
FIG. 1 is an isometric view of a light-reflecting and light-shielding apparatus in accordance with a preferred embodiment of the present invention, including a computer panel.

Referring to FIG. 1, a light reflecting and shielding apparatus in accordance with a preferred embodiment of the present invention, includes a computer panel 10.

The computer panel 10 includes a base 11, and a bent plate 13 generally perpendicular to the base 11. A pair of elongated hooks 18 protrudes from the inner surface of the base 11. Each elongated hook 18 includes a supporting pole 181 and a clasp 183 protruding from a free end of the supporting pole 181. A pair of positioning posts 17 is formed from the inner surface of the base 11 adjacent each elongated hook 18. Each positioning post 17 defines a positioning hole 171 therein. A receiving hole 15 is defined in the base 11 between the pair of elongated hooks 18. A pair of parallel guiding protrusions 132, each with a slot defined therein, is formed on an inner surface of the bent plate 13, and extends along a direction perpendicular to the base 11. A generally ellipse-shaped through opening is defined in the bent plate 13, and extends along a direction perpendicular to the guiding protrusions 132. A light-pervious area, such as a generally ellipse-shaped transparent board 131, is fitted in the through opening by engaging with the slots of the guiding protrusions 132. A rectangular slot 135 is defined in the bent plate 13 adjacent the light-pervious board 131. A pair of tabs 133 protrudes from the slot 135 at opposite side thereof. A plurality of teeth 134 is disposed on one of the tabs 133.

Figure 2:
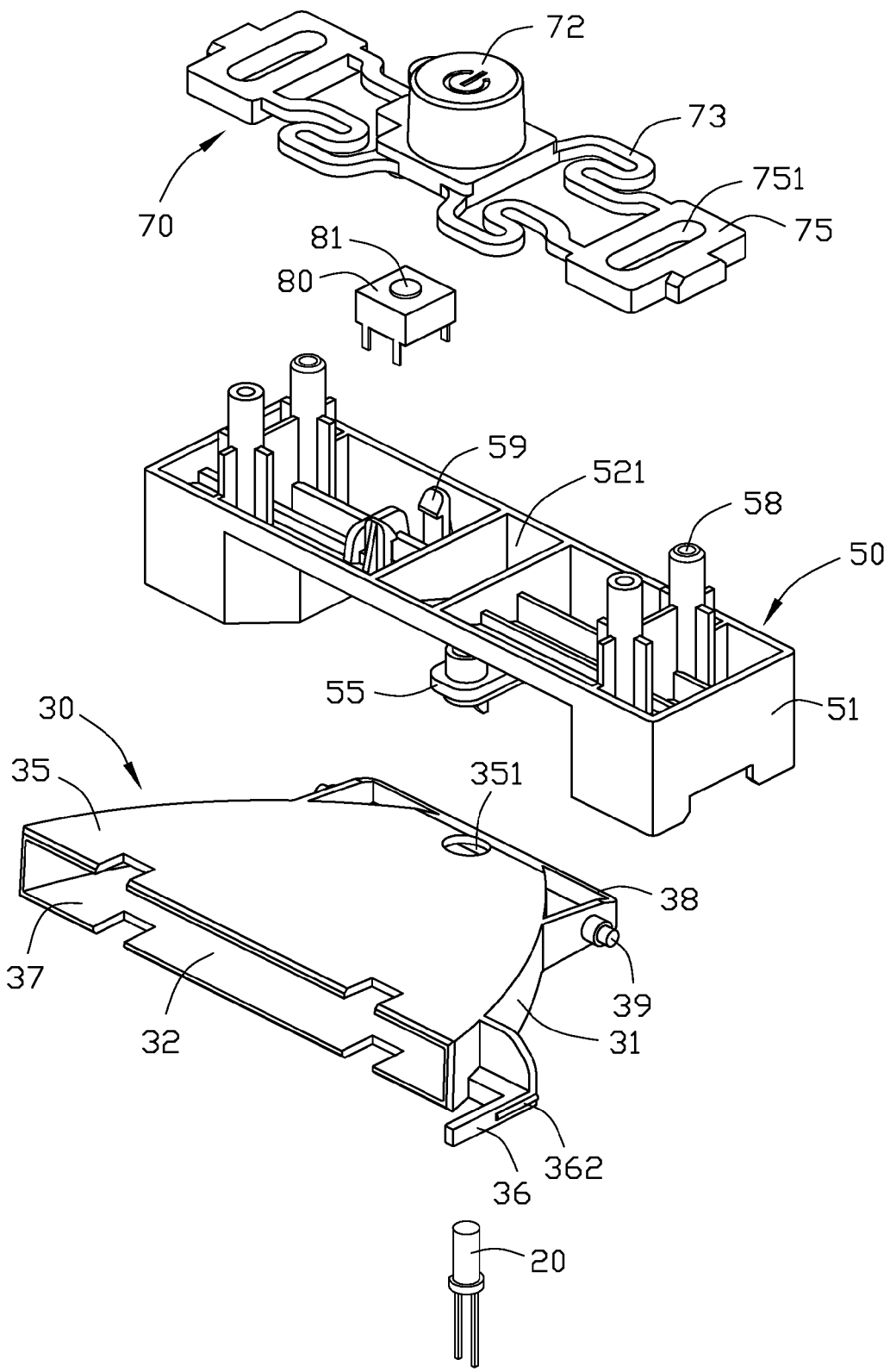
FIG. 2 is an exploded, isometric view of the light-reflecting and light-shielding apparatus of FIG. 1, also including a light-reflecting member, a securing apparatus, a button, and a light source.

Referring also to FIG. 2, the light reflecting and shielding apparatus in accordance with a preferred embodiment of the present invention, also includes a light-reflecting member 30 for reflecting rays of a light source 20 and enlarging an illuminated area, a button 70, a switch module 80, and a securing apparatus 50. The light source 20 may, for example, be a light-emitting diode. The light-reflecting member 30 has a hollow body, a semicircular top wall 35, a semicircular bottom wall 37 parallel to the top wall 35, and a generally embowed sidewall 31 integrated with them. A generally rectangular through opening 32 for light passing therethrough, is defined by adjacent edges of the top wall 35, the bottom wall 37, and the sidewall 31. A through hole 351 is defined at a rear end of the light-reflecting member 30, and through the top wall 35 and the bottom wall 37 thereof, for accommodating the light source 30. An operating handle 36 extends forward from a side edge of the light-reflecting member 30, for extending through the slot 135 of the bent plate 13 of the computer panel 10. An engaging projection 362 protrudes from the operating handle 36 for engaging with the teeth 134 of the tab 133 of the computer panel 10. A pair of jointing portions 38 protrudes from the sidewall 31 at opposite sides thereof respectively. Each jointing portion 38 defines a pivot 39 therein.

The button 70 includes a button portion 72, a pair of elastic portions 73 extends from the button portion 72 at opposite sides thereof respectively. A mounting portion 75 extends from each elastic portion 73 at the free end thereof, the mounting portion 75 includes an ellipse-shaped mounting hole 751.

The button 70 also includes a pressing portion (not shown) for triggering a switch head 81 of the switch module 80.

Figure 3:
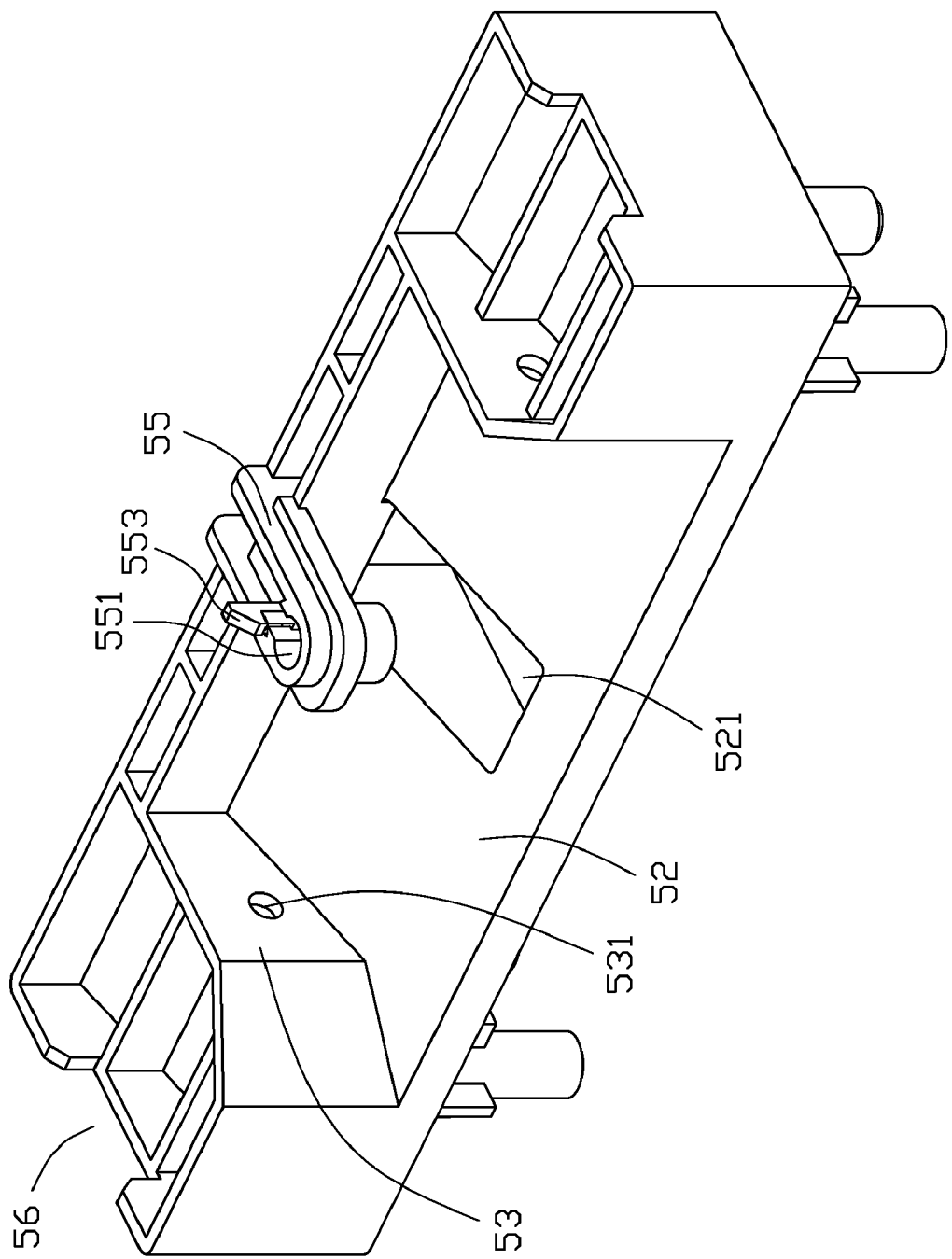
FIG. 3 is an enlarged isometric view of the securing apparatus of FIG. 2.
Figure 4:
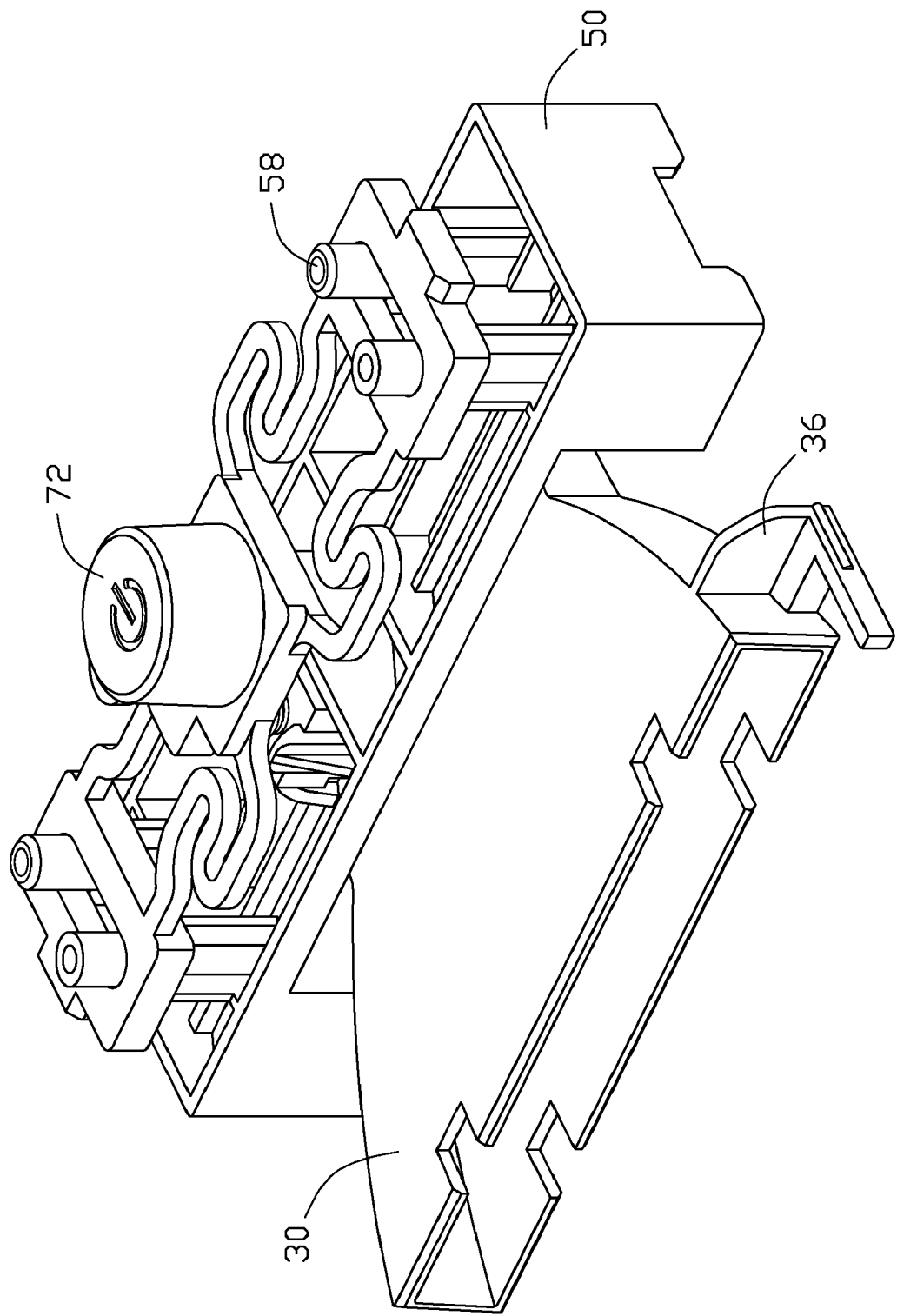
FIG. 4 is an assembled view of the button, the securing apparatus, and the light-reflecting member of FIG. 2.
Figure 5:
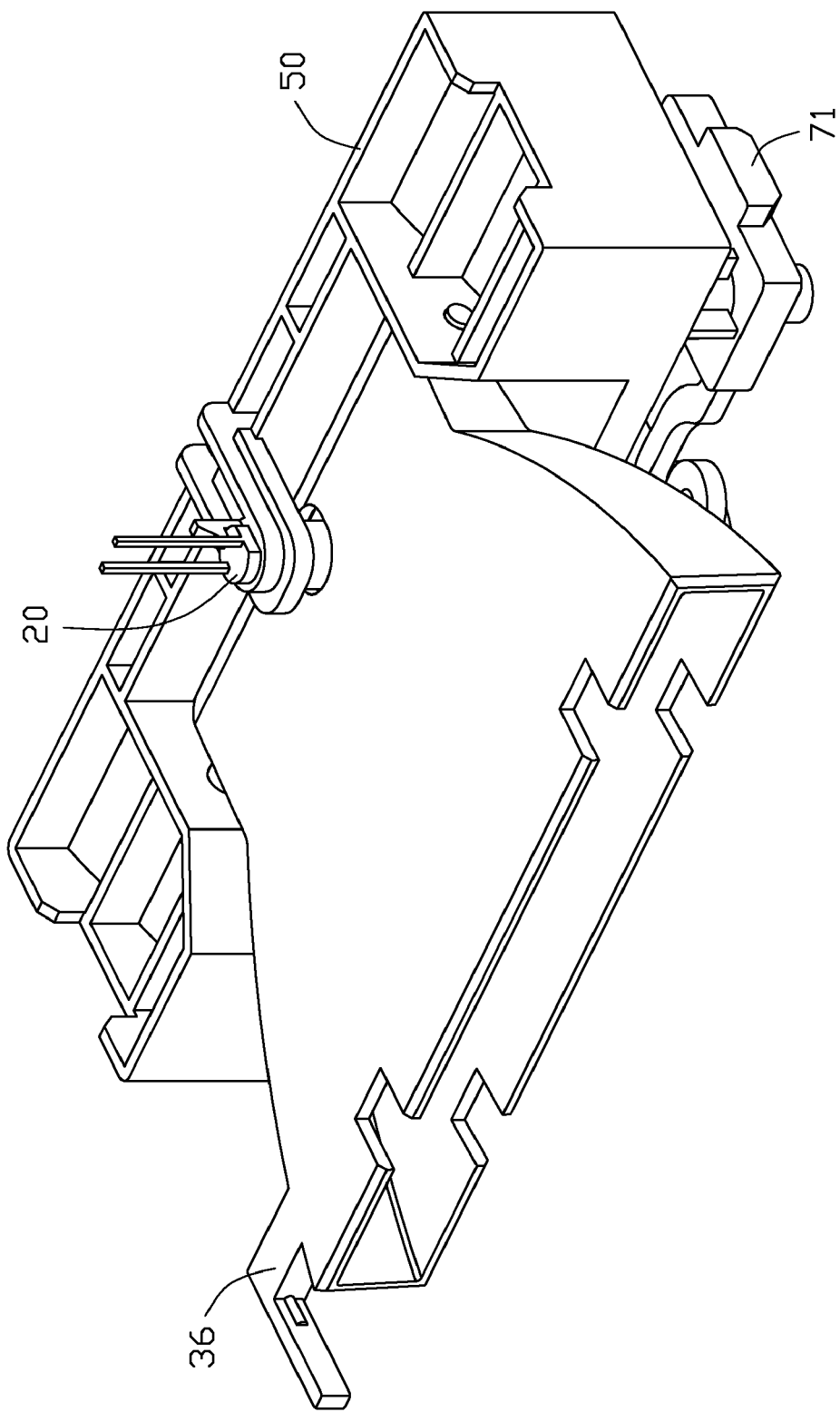
FIG. 5 is similar to FIG. 4 but viewed from another aspect.
Figure 6:
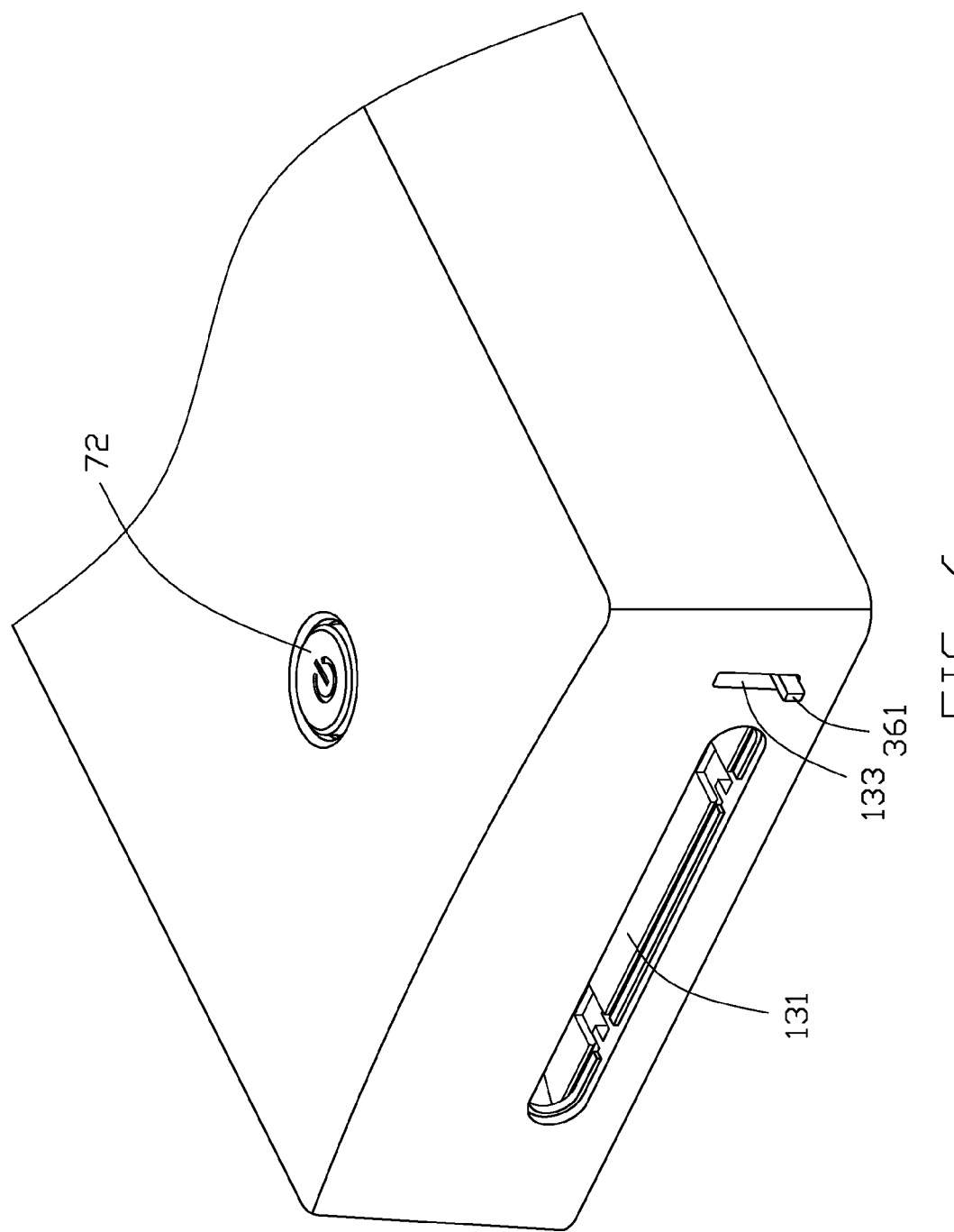
FIG. 6 is an assembled view of the light-reflecting and light-shielding apparatus.
Figure 7:
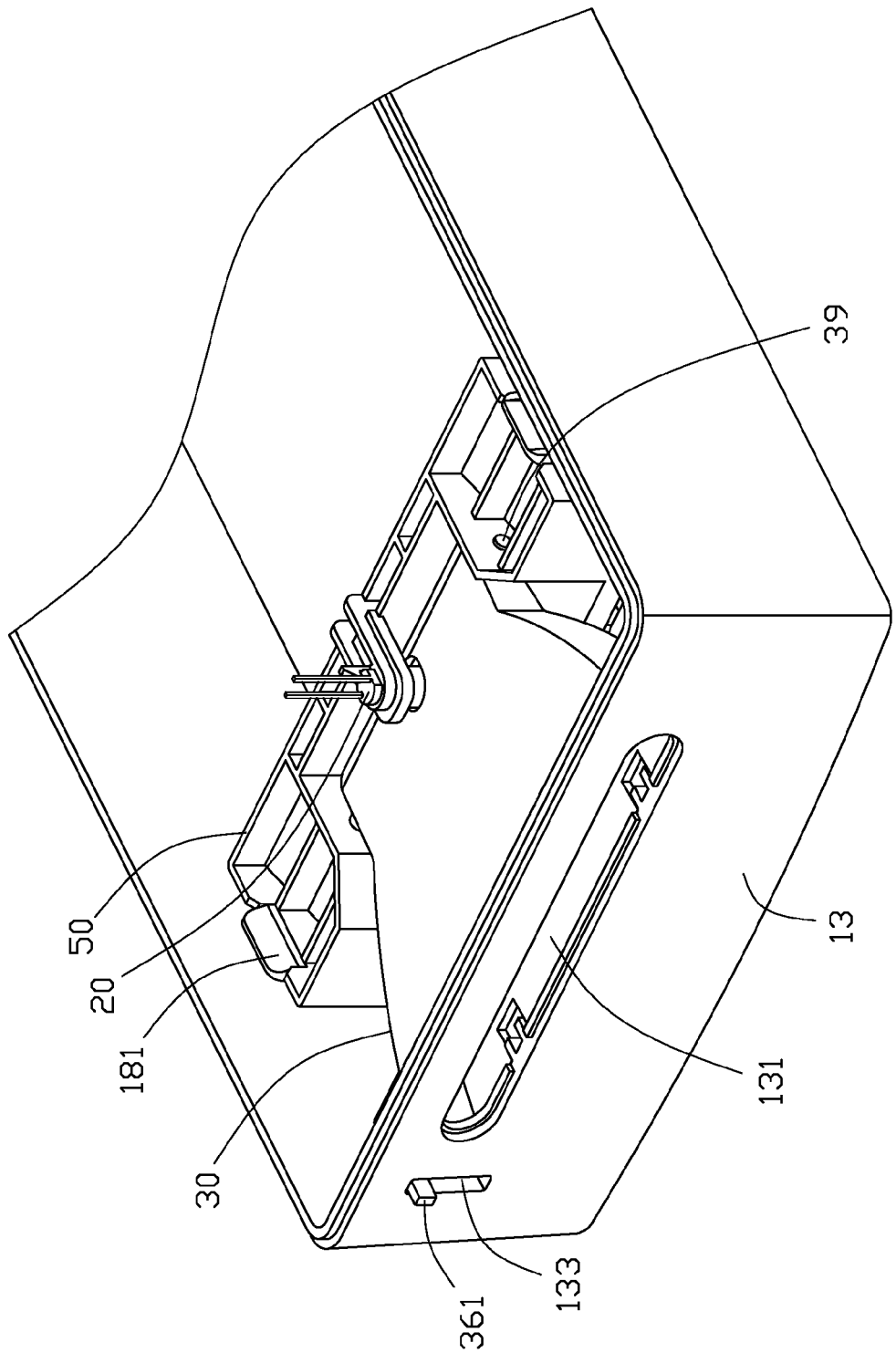
FIG. 7 is similar to FIG. 6, but viewed from another aspect.

Referring also to FIG. 3, the securing apparatus 50 includes a base 51. A trapeziform bevel 52 is formed from a side of the base 51. A pair of clips 53 each of which have a pivoting hole 531 defined therein, extends up from the bevel 52 at opposite sides thereof, for receiving the pivot 39 of the light-reflecting member 30. A mounting portion 55 extends from a higher side of the bevel 52 between the pair of clips 53. The mounting portion 55 includes a receiving hole 551 for receiving the light source 20 and a hook 553 for securing the light source 20 in the receiving hole 551. A through opening 521 is defined in the base 51 corresponding to the mounting portion 55. Two pair of mounting posts 58 having a plurality of supporting poles (not labeled) extending therearound, protrudes down from the base 51 of the securing apparatus 50, for engaging in the positioning holes 171 of the positioning post 17 of the computer panel 10. A pair of hooks 59 for securing the power module 80 extends down from the base 51 of the securing apparatus 50. A pair of locking openings 56 is formed from the securing apparatus 50 at side edges thereof, for receiving the corresponding clasps 183 of the elongated hooks 18.

Referring also to FIGS. 4 to 7, in assembly, the switch module 80 is secured on the securing apparatus 50. The positioning posts 58 of the securing apparatus 50 are inserted into the corresponding mounting holes 751 of the button 70 respectively. At this time, the pressing portion contacts the switch head 81 of the switch module 81. The pivots 39 of the light-reflecting member 30 are mounted in the corresponding pivoting holes 531 respectively. The light source 20 is inserted into the receiving hole 551 of the light-reflecting member 30 and secured by the hook 553 of the light-reflecting member 30. Then the light-reflecting member 30 is pushed toward the base 11, until the positioning posts 58 are respectively inserted into the positioning holes 171 of the positioning posts 17. The hook protrusions 183 of the elongated hooks 18 engage with the locking openings 56 respectively. The light-reflecting member 30 is thus secured on the computer panel 10. The light source 20 is positioned in the through hole 351, and electrically connected with the computer system for receiving power. The operating handle 65 extends through the slot 135 of the bent plate 13 of the computer panel 10, thereby exposing it, and the teeth 134 of the tab 133 are engaged with the engaging projection 362 of the light-reflecting member 30 for positioning the light-reflecting member 30. The button portion 72 is received in the receiving hole 15 of the computer panel 10 and exposed outside. The through opening 32 of the light-reflecting member 30 is aligned with the transparent board 20.

Figure 8:
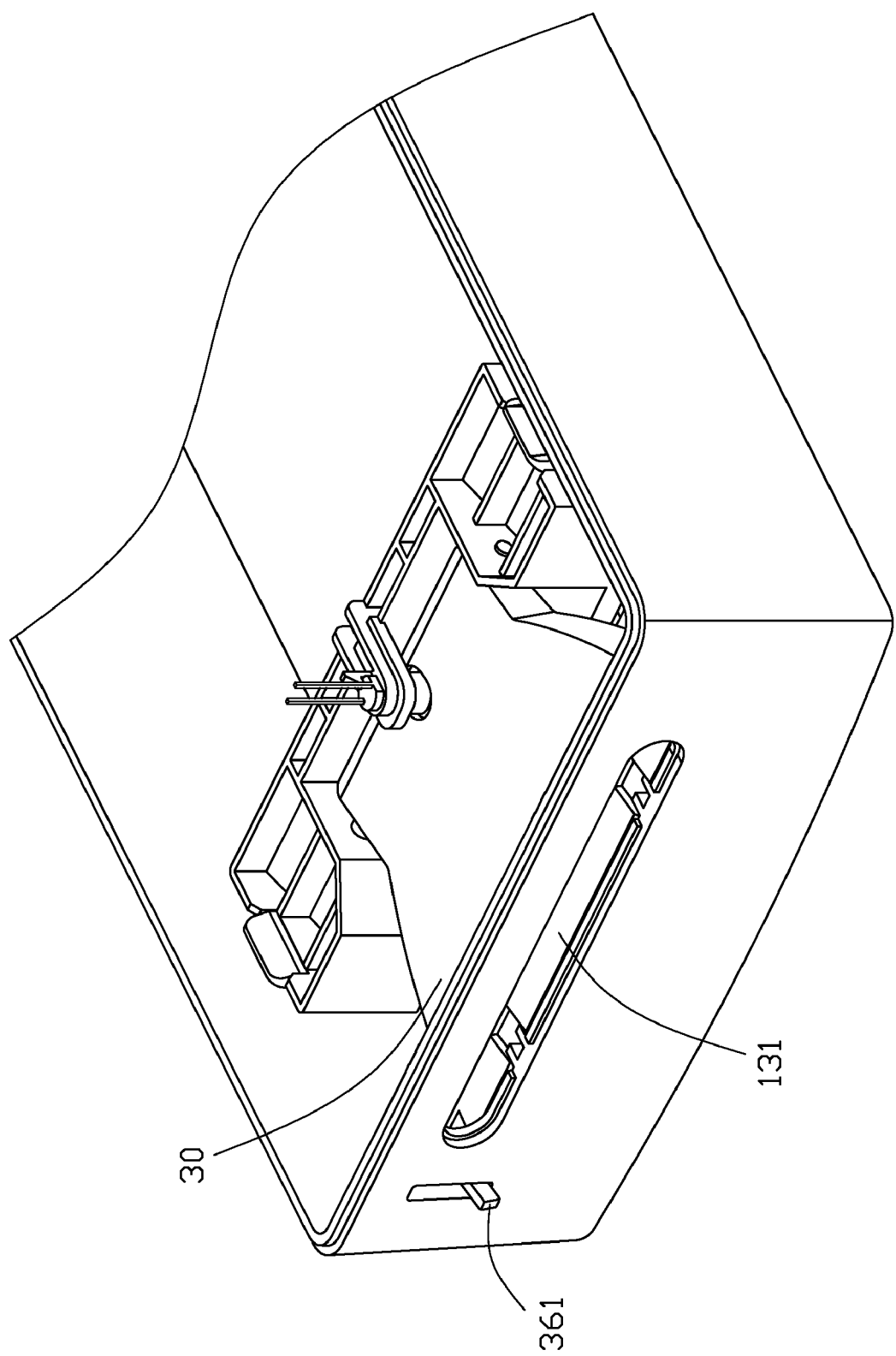
FIG. 8 is similar to FIG. 7, the light-reflecting member rotated down.

In use, when the computer system is on, the light source 20 emits light. Some rays of the light source 20 shine on the button portion 72 through the through hole 351 of the light-reflecting member 30 and the through opening 521 of the securing apparatus 50. Normally, the through opening 32 of the light-reflecting member 30 is aligned with the transparent board 131. Some rays directly irradiate the transparent board 131, and other rays are reflected onto the transparent board 131 by an inner surface of the light-reflecting member 30. Thus, the button portion 72 and the transparent board 131 are both illuminated, thereby rendering a beautiful effect on the computer panel 10 when the computer system is on. If users want the light only partially illuminating the transparent board 131, the light-reflecting member 30 is rotated down to a position, which allows the desired amount of illumination, by pulling down the operating handle 36. If users don't want the transparent board 131 to be illuminated at all, the operating handle 36 of the light-reflecting member 30 can be pulled down until there is no light to illuminate the transparent board 131. Thus, the transparent board 20 is shielded from the light, as best shown in FIG. 8.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A panel assembly comprising:
    a panel comprising a base and a bent plate perpendicular to the base, the bent plate having a light-pervious area; and
    a light-reflecting member pivotably mounted to the base of the panel, the light-reflecting member defining an opening facing the light-pervious area, for directing light rays to be incident on the light-pervious area through the opening thereof, wherein the light-reflecting member is rotatable to change position of the opening of the light-reflecting member relative to the light-pervious area, thereby adjusting the brightness of the light-previous area.

2. The panel assembly as described in claim 1, wherein a handle extends from a side of the light-reflecting member, and a slot is defined in the bent plate of the panel adjacent the light-pervious area to receive the handle, wherein the handle is slidable in the slot, so that the opening of the light-reflecting member is driven to slide relative to the light-pervious area.

3. The panel assembly as described in claim 2, wherein an engaging projection extends from the handle, and at least a tab with teeth engaged with the engaging projection extends from the bent plate of the panel, so that the handle can be positioned at different positions.

4. The panel assembly as described in claim 1, further comprising a securing apparatus, wherein the light-reflecting member is pivotably mounted to the securing apparatus, the securing apparatus is secured on the base of the panel, a pair of pivots is formed from the light-reflecting member at opposite sides thereof, and a pair of pivoting holes corresponding to the pivots is formed on the securing apparatus.

5. The panel assembly as described in claim 4, wherein at least a positioning post protrudes from the securing apparatus, and at least a positioning hole is defined in the base of the panel for the positioning post inserting therein.

6. The panel assembly as described in claim 4, wherein a plurality of hooks protrudes from the base of the panel, and a plurality of receiving openings is defined in the securing apparatus for engaging with the hooks.

7. The panel assembly as described in claim 1, wherein a mounting portion formed from the light-reflecting member comprises a receiving hole for receiving a light source and a hook for securing the light source on the light-reflecting member, formed from the light-reflecting member.

8. A panel assembly comprising:
    a panel with a light-pervious area;
    a light source for emitting light rays; and
    a light-reflecting member having a front-to-back opening, for directing the light rays to the light-pervious area of the panel through the opening;
    wherein the light-reflecting member is pivotably mounted on the panel, the light-reflecting member is rotatable and retained at different positions between a first position where the opening of the light-reflecting member is aligned with the light-pervious area of the panel and a second position where the opening of light-reflecting member is misaligned with the light-pervious area of the panel.

9. The panel assembly as described in claim 8, wherein the panel comprises a base and a bent plate perpendicular to the base, and the light-pervious area is located on the bent plate of the panel.

10. The panel assembly as described in claim 9, wherein a handle extends from a side of the light-reflecting member, and a slot is defined on the bent plate of the panel adjacent the light-pervious area to receive the handle, wherein the handle is slidable in the slot, so that the opening of the light-reflecting member is driven to slide relative to the light-pervious board.

11. The panel assembly as described in claim 10, wherein an engaging projection extends from the handle, and at least a tab with teeth engaged with the engaging projection extends from the bent plate of the panel, so that the handle can be positioned at different positions.

12. The panel assembly as described in claim 9, further comprising a securing member wherein the light-reflecting member is pivotably mounted to the securing apparatus, the securing apparatus is secured on the base of the panel, a pair of pivots is formed from the light-reflecting member at opposite sides thereof respectively, and a pair of pivoting holes corresponding to the pivots is formed on the securing apparatus.

13. The panel assembly as described in claim 12, wherein at least a positioning post protrudes from the securing apparatus, and at least a positioning hole is defined in the base of the panel for the positioning post inserting therein.

14. The panel assembly as described in claim 12, wherein a plurality of hooks protrudes from the base of the panel, and a plurality of receiving openings is defined in the securing apparatus for engaging with the hooks.

15. The panel assembly as described in claim 8, wherein a mounting portion formed from the light-reflecting member comprises a receiving hole for receiving a light source and a hook for securing the light source on the light-reflecting member, formed from the light-reflecting member.

16. A panel assembly comprising:
 a panel with a light-pervious area formed thereon, the panel defining a slot therein;
 a light-reflecting member pivotably mounted on the panel, the light-reflecting member defining an opening for directing light rays to the panel, a handle formed on the light-reflecting member and extending out of the panel via the slot, wherein the light-reflecting member is rotated when the handle is actuated, so as to direct light rays to different parts of the panel; and
 an engaging projection extending from the handle, and at least a tab with teeth extending from the panel; the engaging projection capable of engaging with different teeth so that the handle can be positioned at different positions on the panel.

17. The panel assembly as described in claim 16, further comprising a securing apparatus, wherein the light-reflecting member is pivotably mounted to the securing apparatus, the securing apparatus is secured on the panel, a pair of pivots is formed on the light-reflecting member at opposite sides thereof, and a pair of pivoting holes are defined in the securing apparatus for pivotably receiving the pivots.

18. The panel assembly as described in claim 17, wherein at least a positioning post protrudes from the securing apparatus, and at least a positioning hole is defined in the panel for receiving the at least a positioning post.

19. The panel assembly as described in claim 16, wherein a mounting portion formed on the light-reflecting member comprises a receiving hole for receiving a light source, and a hook is formed on the light-reflecting member for securing the light source in the receiving hole.

\* \* \* \* \*